(12) United States Patent
Soyama

(10) Patent No.: US 10,927,031 B2
(45) Date of Patent: *Feb. 23, 2021

(54) METHOD FOR DIVIDING BRITTLE-MATERIAL SUBSTRATE

(71) Applicant: Mitsuboshi Diamond Industrial Co., Ltd., Settsu (JP)

(72) Inventor: Hiroshi Soyama, Settsu (JP)

(73) Assignee: MITSUBOSHI DIAMOND INDUSTRIAL CO., LTD.

( * ) Notice: Subject to any disclaimer, the term of this patent is extended or adjusted under 35 U.S.C. 154(b) by 290 days.

This patent is subject to a terminal disclaimer.

(21) Appl. No.: 15/127,052

(22) PCT Filed: Mar. 12, 2015

(86) PCT No.: PCT/JP2015/057316
§ 371 (c)(1),
(2) Date: Sep. 19, 2016

(87) PCT Pub. No.: WO2015/151755
PCT Pub. Date: Oct. 8, 2015

(65) Prior Publication Data
US 2017/0113960 A1   Apr. 27, 2017

(30) Foreign Application Priority Data
Mar. 31, 2014 (JP) .............................. JP2014-074089

(51) Int. Cl.
*C03B 33/10* (2006.01)
*B28D 1/22* (2006.01)
*B28D 5/00* (2006.01)

(52) U.S. Cl.
CPC ............ *C03B 33/105* (2013.01); *B28D 1/225* (2013.01); *B28D 5/0011* (2013.01)

(58) Field of Classification Search
CPC ..... C03B 33/105; B28D 5/0011; B28D 1/225; B25D 5/0005; B25D 5/0011; B25D 5/0017; B25D 5/0023; B25D 5/0035
See application file for complete search history.

(56) References Cited

U.S. PATENT DOCUMENTS 3,138,875 A * 6/1964 Christensen ............ B24B 53/12
30/164.9
3,230,625 A    1/1966 Meyer ............................... 33/32
(Continued)

FOREIGN PATENT DOCUMENTS

CN    101579854 A    11/2009
CN    102026926 A    4/2011
(Continued)

OTHER PUBLICATIONS

Decision to Grant a Patent dated Mar. 16, 2018 issued in corresponding Application No. 10-2016-7026885.
(Continued)

*Primary Examiner* — Jonathan G Riley
(74) *Attorney, Agent, or Firm* — Ostrolenk Faber LLP

(57) ABSTRACT

A cutter edge is pressed against a brittle-material substrate so that a protruding portion of the cutter edge is positioned between a first edge of the brittle-material substrate and a side portion of the cutter edge and that a side portion of the cutter edge is positioned between the protruding portion of the cutter edge and a second edge of the brittle-material substrate. A scribe line is formed by a scratch between a first position closer to the first edge of the first and second edges and a second position closer to the second edge of the first and second edges. After the formation of the scribe line, a crack is extended in a thickness direction from the second position toward the first position along the scribe line, thus forming a crack line.

19 Claims, 23 Drawing Sheets

(56) References Cited

U.S. PATENT DOCUMENTS

| | | | | |
|---|---|---|---|---|
| 3,680,213 | A | * | 8/1972 | Reichert .............. B28D 5/0011 |
| | | | | 257/E21.239 |
| 5,963,289 | A | * | 10/1999 | Stefanov ........... G02F 1/133351 |
| | | | | 349/187 |
| 8,723,314 | B2 | * | 5/2014 | Su ........................... H01L 21/78 |
| | | | | 257/737 |
| 2005/0212092 | A1 | * | 9/2005 | Nishizawa .............. H01L 21/78 |
| | | | | 257/622 |
| 2007/0164072 | A1 | | 7/2007 | Nishio |
| 2009/0078105 | A1 | * | 3/2009 | Maekawa .............. B28D 1/225 |
| | | | | 83/886 |
| 2009/0183617 | A1 | | 7/2009 | Ito et al. ......................... 83/879 |
| 2011/0300661 | A1 | * | 12/2011 | Pearce ................. H01L 31/048 |
| | | | | 438/66 |
| 2012/0012632 | A1 | * | 1/2012 | Tominaga ................ B28D 1/24 |
| | | | | 225/2 |
| 2012/0312141 | A1 | * | 12/2012 | Tomei ...................... B26D 3/08 |
| | | | | 83/880 |
| 2013/0313301 | A1 | * | 11/2013 | Brown .................. C03B 33/023 |
| | | | | 225/2 |
| 2014/0292344 | A1 | * | 10/2014 | Le Neel ................ H02J 7/0021 |
| | | | | 324/426 |
| 2015/0097272 | A1 | * | 4/2015 | Jang ...................... H01L 23/544 |
| | | | | 257/620 |
| 2017/0103925 | A1 | * | 4/2017 | Jhon ........................ H01L 21/52 |

FOREIGN PATENT DOCUMENTS

| | | | |
|---|---|---|---|
| CN | 102275229 A | | 12/2011 |
| CN | 102807316 A | | 12/2012 |
| JP | 09-188534 | | 7/1997 |
| JP | 2000-264656 | | 9/2000 |
| JP | 2003-183040 A | | 7/2003 |
| JP | 2007-331983 A | | 12/2007 |
| JP | 2008-201629 A | | 9/2008 |
| JP | 2009-208237 | | 9/2009 |
| JP | 2009208237 A | * | 9/2009 |
| JP | WO 2009/128334 A1 | | 10/2009 |
| JP | 2011-054709 | | 3/2011 |
| JP | 2011054709 A | * | 3/2011 |
| JP | 2012-000793 A | | 1/2012 |
| JP | 2013-010644 A | | 1/2013 |

OTHER PUBLICATIONS

Korean Office Action (Application No. 10-2016-7026885)) dated Sep. 26, 2017 and its partial English translation.
Extended EP Search Report dated Nov. 7, 2017 issued in corresponding European Patent Application (Application No. 15772939.3).
German Article in Wikipedia: "Glasschneider" (glass cutter) published on Oct. 29, 2013, XP055419231, URL: https//de.wikipedia.org/w/index.php?title=Glasschneider&oldid=123936432 and its machine English translation thereof.
Office Action dated Feb. 13, 2018 in counterpart Chinese Patent Application No. 201580017504.7 with partial English translation.
International Search Report dated Jun. 16, 2015 in corresponding PCT International Application No. PCT/JP2015/057316.
Extended European Search Report and Opinion dated Jul. 2, 2019 in counterpart European Patent Application No. EP 18 20 5159.
Chinese Office Action (Application No. 201580017504.7) dated May 16, 2017 and its partial English translation.
Japanese Office Action (Application No. 2016-511500) dated May 23, 2017 and its partial English translation.
International Preliminary Report on Patentability (IPRP) issued by the International Bureau of WIPO dated Oct. 13, 2016 in connection with corresponding application PCT/JP2015/057316, with English translation.

* cited by examiner

F I G . 6
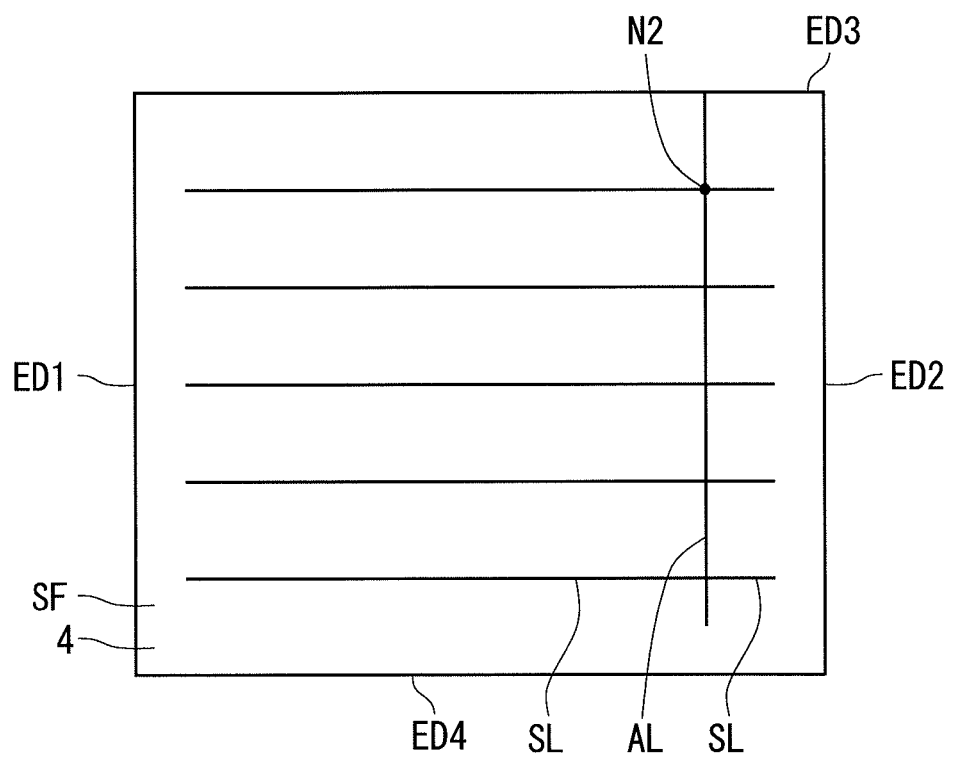

F I G. 7
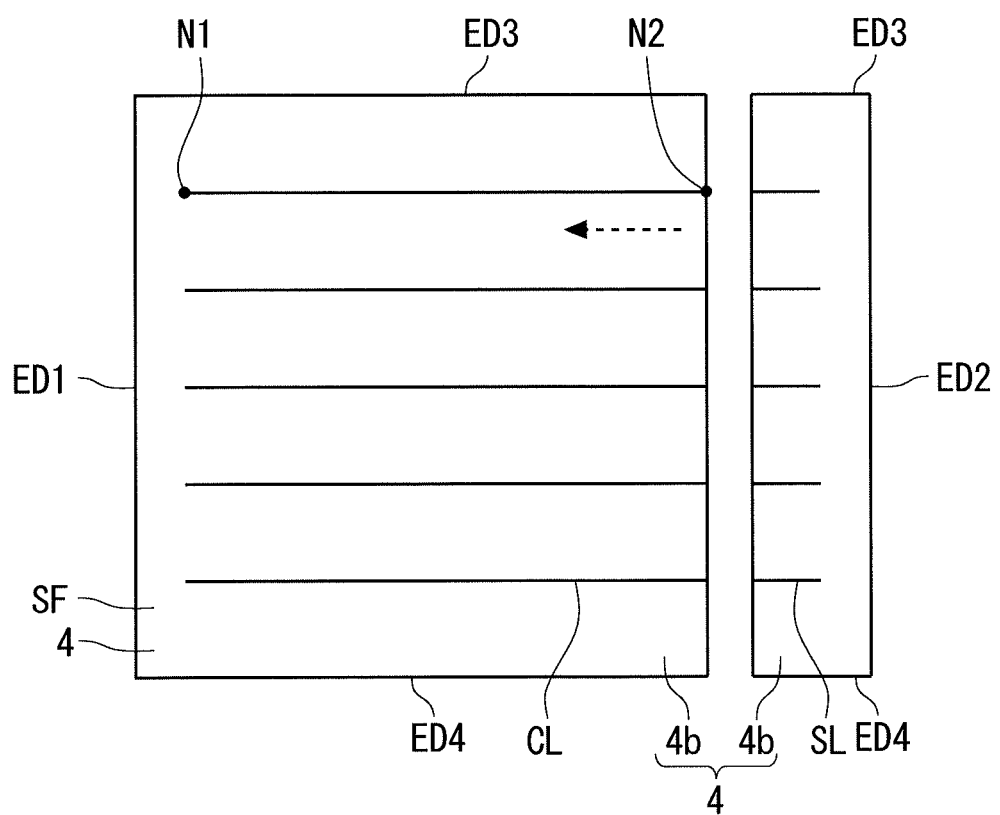

F I G . 8
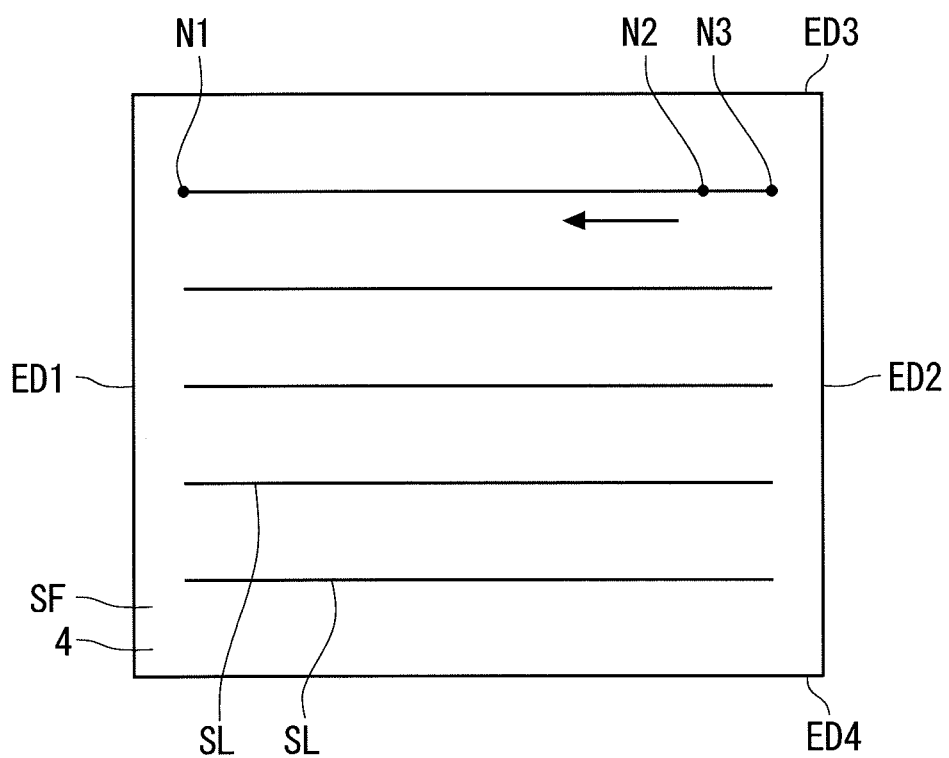

F I G . 9
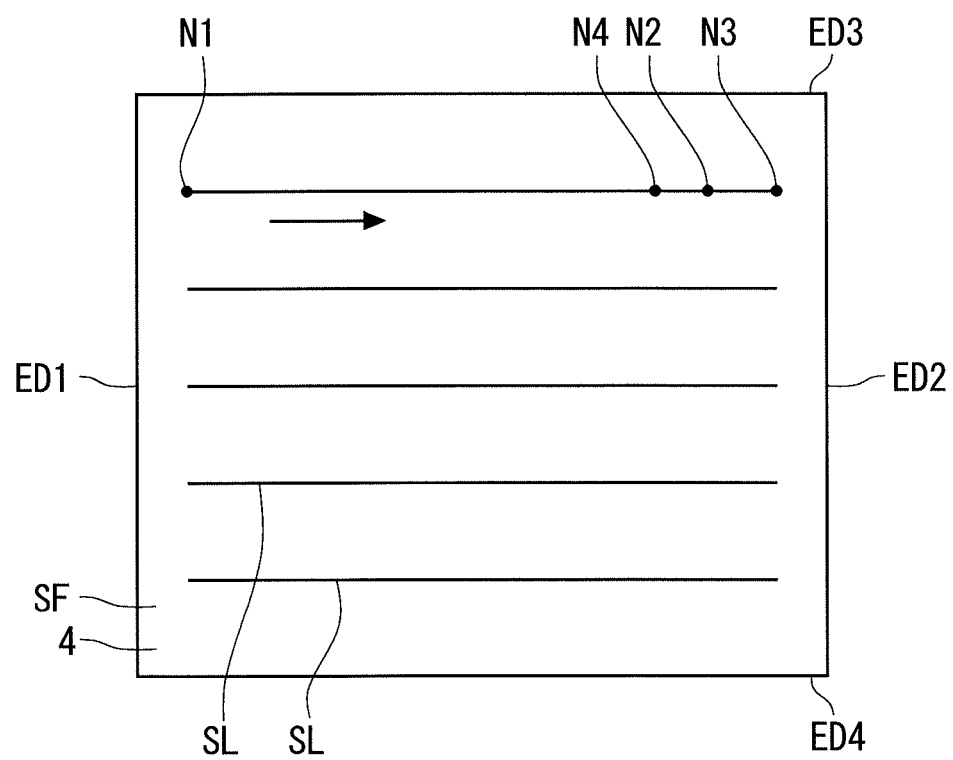

F I G . 1 2
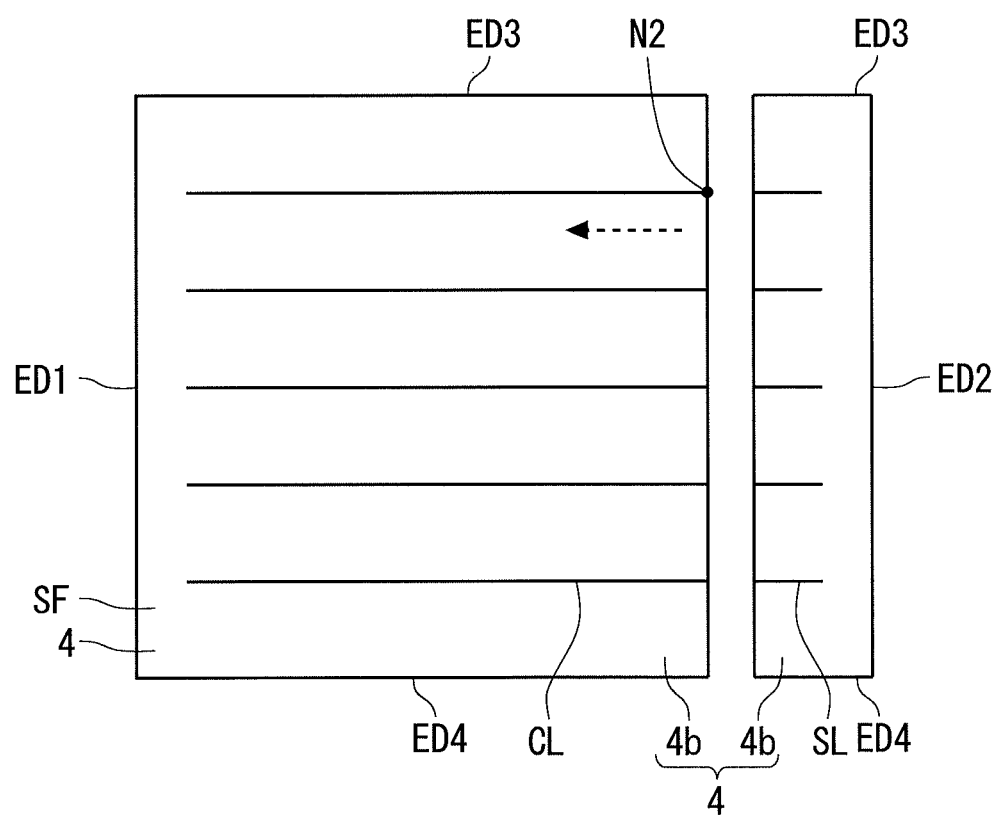

F I G . 1 7
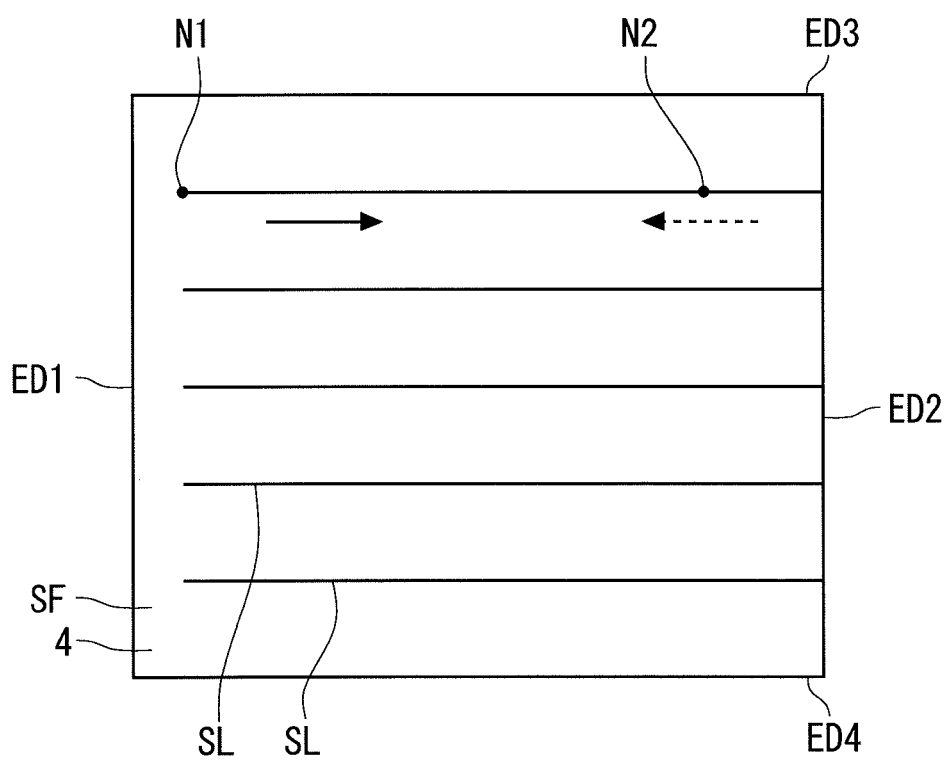

F I G . 1 8
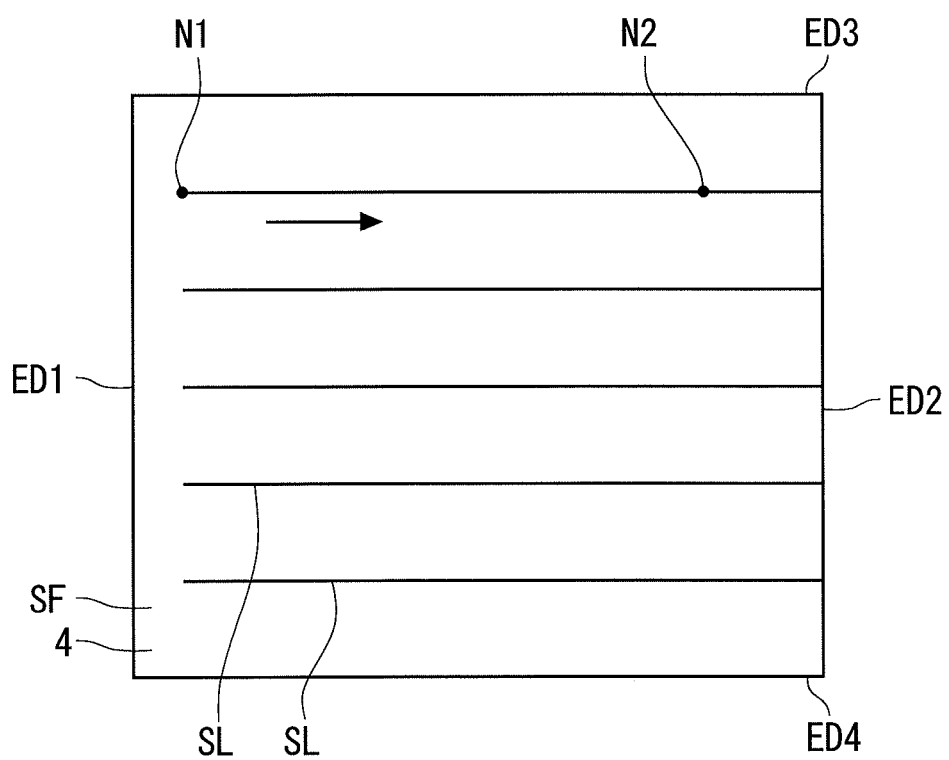

F I G . 1 9
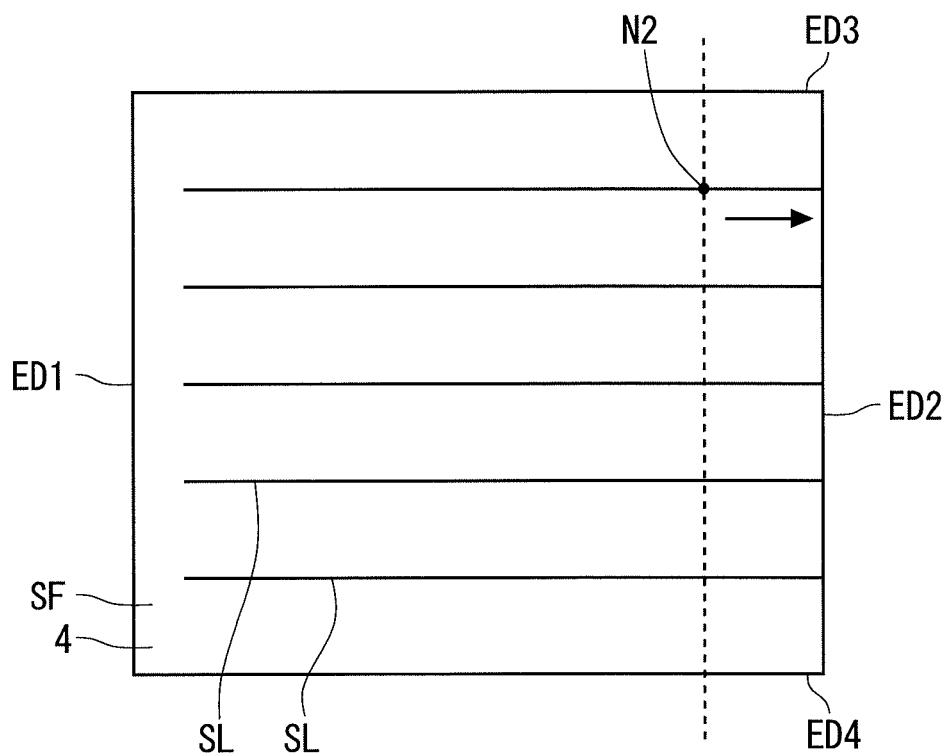

F I G . 2 0
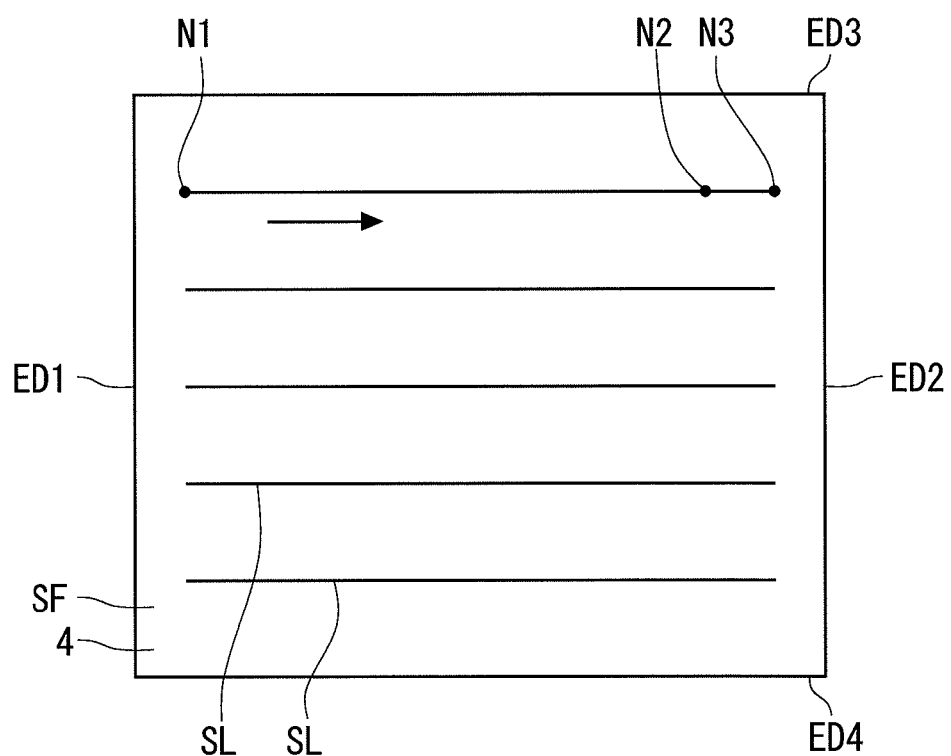

METHOD FOR DIVIDING BRITTLE-MATERIAL SUBSTRATE

CROSS-REFERENCE TO RELATED APPLICATIONS

The present application is a 35 U.S.C. §§ 371 national phase conversion of PCT/JP2015/057316, filed Mar. 12, 2015, which claims priority to Japanese Patent Application No. 2014-074089, filed Mar. 31, 2014, the contents of both of which are incorporated herein by reference. The PCT International Application was published in the Japanese language.

TECHNICAL FIELD

The present invention relates to a method for dividing a brittle-material substrate.

BACKGROUND ART

The manufacture of electrical equipment such as a flat display panel or a solar panel often needs dividing of a brittle-material substrate such as a glass substrate. In a typical dividing method, a scribing apparatus forms a crack, which has penetrated at least partially in the thickness direction of a substrate, extending linearly (hereinafter referred to as a crack line) on a front surface of the substrate.

According to Japanese Patent Application Laid-Open No. 09-188534 (Patent Document 1), a dent in the upper surface of a glass plate is a chip of glass caused in scribing, which is referred to as a scribe line. Also according to Patent Document 1, simultaneously with marking of the scribe line, a crack occurs that extends from the scribe line toward beneath the scribe line. The crack line is formed simultaneously with the formation of the scribe line.

If a crack penetrates fully in the thickness direction, the substrate can be divided along a crack line through only the formation of the crack line. If a crack penetrates only partially in the thickness direction, a stress is applied to the substrate in a step referred to as a breaking step after the formation of the crack line. The crack of the crack line fully penetrates in the thickness direction in the breaking step, so that the substrate is divided. Without such a crack line, the substrate cannot be divided along the scribe line even when a stress is applied to the substrate in the breaking step. To reliably divide a glass plate, thus, the reliable formation of a crack line has been required.

The formation of a crack line needs a crack that is a starting point of the crack line (hereinafter referred to as a starting-point crack). The starting-point crack can be easily formed by a cutter edge riding over a perimeter of a substrate because a fracture tends to occur locally at the perimeter of the substrate. The cutter edge that has rode over the perimeter further slides on the surface of the glass substrate to extend the crack line from the starting-point crack. Unfortunately, the cutter edge's operation to ride over the perimeter of the substrate can cause severe damage to the cutter edge or a large chip on the perimeter of the substrate. It is therefore desirable in many cases to avoid such an operation completely or reduce the occurrence of such an operation.

A method independent of riding of a cutter edge over the perimeter of a substrate is studied as a method for forming a starting-point crack. According to Japanese Patent Application Laid-Open No. 2000-264656 (Patent Document 2), a scribing apparatus includes a scribe body including a cutter and a vibration generating device for applying a vibration to the cutter. This method relatively moves the scribe body along a work surface in a state separated from and above a work, thus positioning the cutter directly above the scribing start point. The scribe body is then lowered to allow the tip of the cutter to abut against the scribing start point by a dead weight of the scribe body. Subsequently, an impact is applied to the scribe body, thus forming a starting-point crack at the scribing start point apart from the perimeter on the work surface. The application of a vibration to the work forms a scribe line with the starting-point crack being a trigger.

PRIOR ART DOCUMENTS

Patent Documents

Patent Document 1: Japanese Patent Application Laid-Open No. 09-188534 (1997)
Patent Document 2: Japanese Patent Application Laid-Open No. 2000-264656

SUMMARY OF INVENTION

Problems to be Solved by the Invention

To form a crack line, the shape, scribing load, scribing speed, and the like of a scribe tool need to be adjusted in consideration of various factors such as the type and thickness of a glass plate. The recent development of thinner and higher-strength glass makes it more difficult to reliably form a crack line. For example, if the scribing load is increased to reliably form a crack line, a cutter edge wears away faster, and a larger scratch is caused on a glass surface, resulting in a occurrence of much dust. Also, the scribing speed is difficult to increase. As described above, the conditions for scribing and for a cutter edge to be used in scribing have been narrowed. In some cases, a crack line which is tilted in the thickness direction of a glass plate is formed due to, for example, the undulations of the surface of the glass plate or the stand on which the glass plate is placed, causing the glass edge surface to be tilted after the glass plate is divided.

According to the scribing apparatuses described in Patent Documents 1 and 2, a starting-point crack is formed by applying an impact to the scribe body. To obtain the starting point of the scribing line depending on an impact alone, however, the application of a large impact to the cutter is required. Consequently, the cutter edge of the cutter is severely damaged, and a minute fracture occurs at the scribing starting-point in the surface of the substrate.

The present invention has been made to solve the problems above and has an object to provide a method for dividing a brittle-material substrate, which generates a crack line along a scribe line after the formation of the scribe line and reduces damage to a cutter edge and a surface of a substrate.

Means to Solve the Problems

A method for dividing a brittle-material substrate according to the present invention includes steps below.

A brittle-material substrate is prepared, which includes a surface surrounded by a perimeter including first and second edges opposite to each other and has a thickness direction perpendicular to the surface.

A cutter edge is pressed against the surface of the brittle-material substrate. The cutter edge includes a protruding portion and a side portion extending from the protruding portion and having a convex shape. The cutter edge is pressed so that, on the surface of the brittle-material substrate, the protruding portion of the cutter edge is positioned between the first edge and the side portion and the side portion of the cutter edge is positioned between the protruding portion and the second edge.

The cutter edge pressed in the pressing of a cutter edge is caused to slide on the surface of the brittle-material substrate to form a scribe line having a groove shape between a first position closer to the first edge of the first and second edges and a second position closer to the second edge of the first and second edges on the surface of the brittle-material substrate.

After the formation of the scribe line, a crack of the brittle-material substrate in the thickness direction is extended from the second position toward the first position along the scribe line to form a crack line.

The brittle-material substrate is divided along the crack line.

Effects of the Invention

According to the present invention, after the formation of the scribe line, the crack line can be formed along the scribe line. The crack line needs not to be generated simultaneously with the scribing, thus simplifying the selection of a cutter edge and scribe conditions and also increasing a scribing speed. The influence of uneven surface of the substrate or the stand is small, leading to stabilized, improved quality of the end surface of the brittle material after the dividing. In addition, damage to the cutter edge and the surface of the substrate can be reduced, resulting in a longer life of the cutter edge and an improved strength of the substrate after the dividing.

BRIEF DESCRIPTION OF DRAWINGS

FIG. 6 is a top view schematically illustrating a first step of a method for dividing a glass substrate in a first modification of the first embodiment of the present invention.

FIG. 7 is a top view schematically illustrating a second step of the method for dividing a glass substrate in the first modification of the first embodiment of the present invention.

FIG. 8 is a top view schematically illustrating a step of a method for dividing a glass substrate in a second modification of the first embodiment of the present invention.

FIG. 9 is a top view schematically illustrating a step of a method for dividing a glass substrate in a third modification of the first embodiment of the present invention.

FIG. 12 is a top view schematically illustrating a third step of the method for dividing a glass substrate in the second embodiment of the present invention.

FIG. 17 is a top view schematically illustrating a step of a method for dividing a glass substrate in a third embodiment of the present invention.

FIG. 18 is a top view schematically illustrating a first step of a method for dividing a glass substrate in a fourth embodiment of the present invention.

FIG. 19 is a top view schematically illustrating a second step of the method for dividing a glass substrate in the fourth embodiment of the present invention.

FIG. 20 is a top view schematically illustrating a first step of a method for dividing a glass substrate in a fifth embodiment of the present invention.

DESCRIPTION OF EMBODIMENTS

Figure 1A:
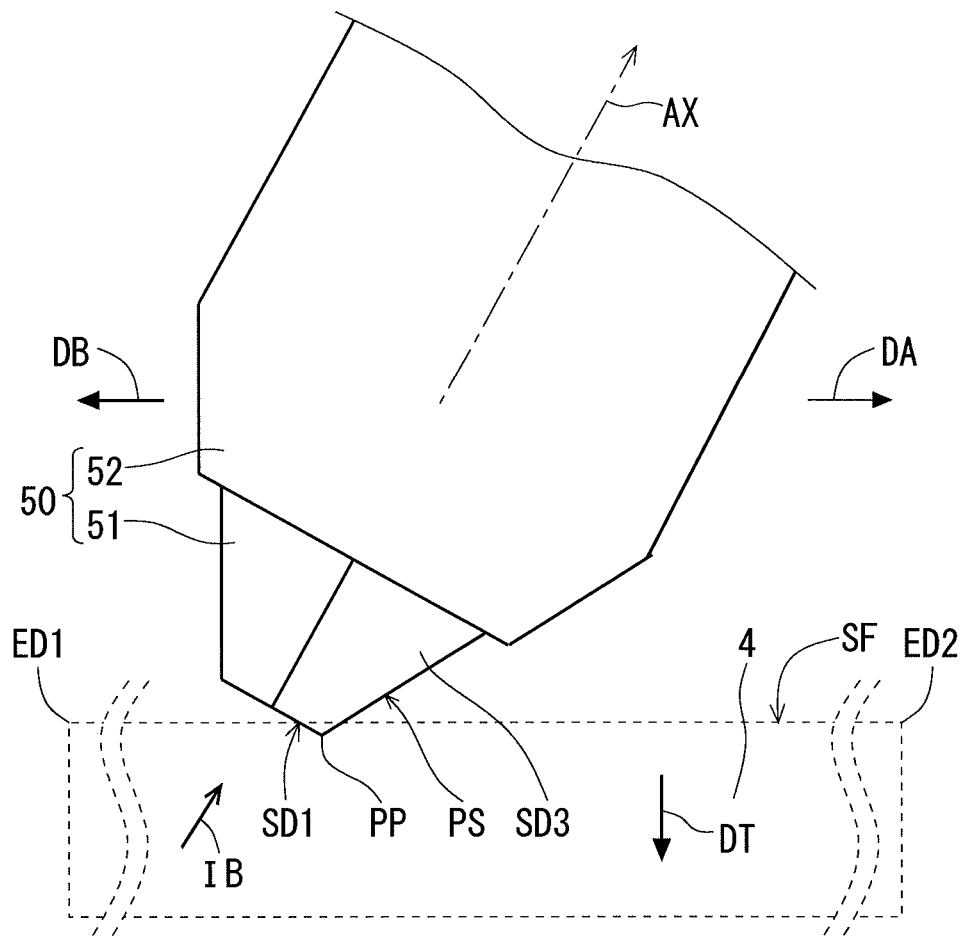
FIG. 1A is a side view schematically illustrating a configuration of a tool for use in a method for dividing a glass substrate in a first embodiment of the present invention.

Embodiments of the present invention will be described below with reference to the drawings. The same or corresponding portions are denoted by the same references in the drawings, and description thereof will not be repeated.

First Embodiment

In the present embodiment, a glass substrate is used as a brittle-material substrate. Other examples of the brittle-material substrate include a ceramic substrate of, for example, low-temperature firing ceramic or high-temperature firing ceramic, a silicon substrate, a compound semiconductor substrate, a sapphire substrate, and a quartz substrate.

Figure 1B:
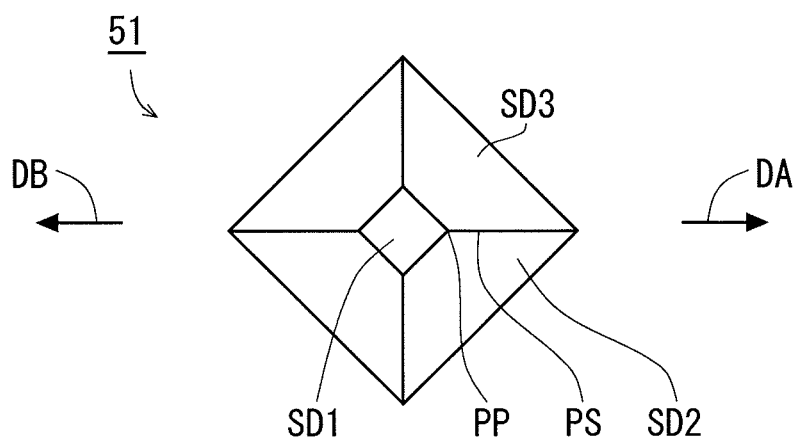
FIG. 1B is a plan view schematically illustrating a configuration of a cutter edge of the tool for use in the method for dividing a glass substrate according to the first embodiment of the present invention, which is seen from an arrow IB of FIG. 1A.

With reference to FIGS. 1A and 1B, a cutting tool 50 is used in a method for dividing a glass substrate in the present embodiment. The cutting tool 50 includes a cutter edge 51 and a shank 52. The cutter edge 51 is held by the shank 52 serving as a holder.

The cutter edge 51 is provided with a top surface SD1 (first surface) and a plurality of surfaces surrounding the top surface SD1. The plurality of surfaces include a side surface SD2 (second surface) and a side surface SD3 (third surface). The top surface SD1 and the side surfaces SD2 and SD3 (the first to third surfaces) are oriented in different directions and are adjacent to each other. The cutter edge 51 has a vertex at which the top surface SD1 and the side surfaces SD2 and SD3 meet, and the vertex forms a protruding portion PP of the cutter edge 51. The side surfaces SD2 and SD3 form a ridge forming a side portion PS of the cutter edge 51. The side portion PS linearly extends from the protruding portion PP. The side portion PS, which is a ridge as described above, has a convex shape extending linearly.

It is desirable that the cutter edge 51 be a diamond point. Specifically, the cutter edge 51 is desirably made of diamond in terms of hardness and reduced surface roughness. More desirably, the cutter edge 51 is made of single-crystal diamond. Still more desirably, in crystallography, the top surface SD1 is a {001} plane, and each of the side surfaces SD2 and SD3 is a {111} plane. In this case, the side surfaces SD2 and SD3 are crystal planes equivalent to each other in crystallography though they have different directions.

Diamond other than single-crystal diamond may be used, and for example, polycrystalline diamond synthesized by chemical vapor deposition (CVD) may be used. Alternatively, sintered diamond may be used that is obtained by binding, with a binder such as iron group elements, polycrystalline diamond particles sintered from particulate graphite or non-graphitic carbon so as not to contain the binder such as iron group elements.

The shank 52 extends along an axial direction AX. The cutter edge 51 is preferably attached to the shank 52 in such a manner that the direction normal to the top surface SD1 extends substantially along the axial direction AX.

Figure 2A:
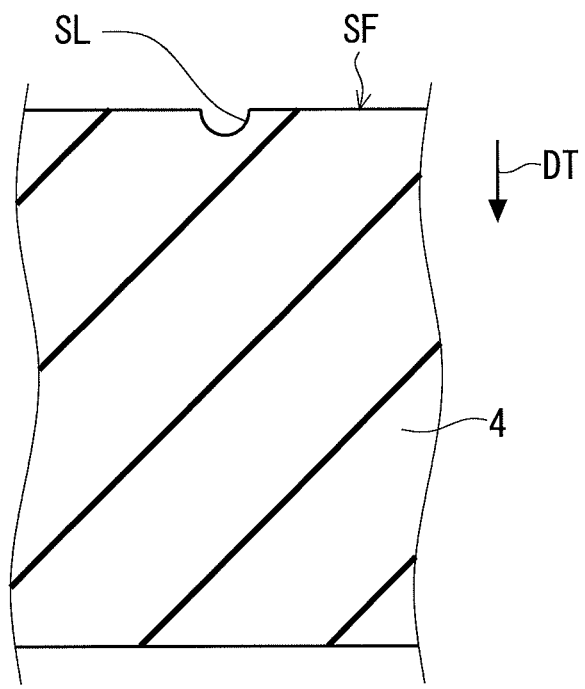
FIG. 2A is a cross-sectional view schematically illustrating a configuration of a scribe line formed in the method for dividing a glass substrate in the first embodiment of the present invention.

With reference to FIG. 2A, to form a scribe line SL using the cutting tool 50, the protruding portion PP and the side portion PS of the cutter edge 51 are pressed against a front surface SF of a glass substrate 4 in a thickness direction DT of the glass substrate 4. Then, substantially along the direction in which the side portion PS is projected onto the front surface SF, the cutter edge 51 is caused to slide on the surface. This forms a groove-shaped scribe line involving no vertical crack on the front surface SF. The groove-shaped scribe line can be generated as a result of at least any of plastic deformation and chipping of the glass substrate 4, and is preferably formed by plastic deformation so as not to cause minute glass fragments due to chipping.

Figure 2B:
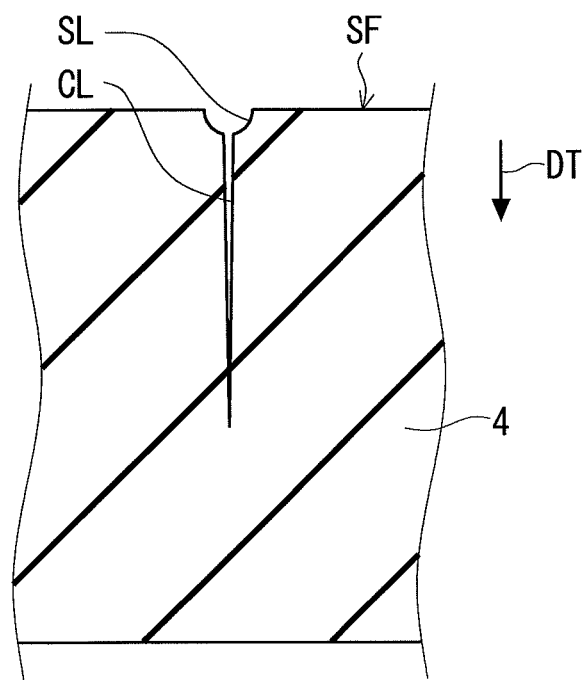
FIG. 2B is a cross-sectional view schematically illustrating a configuration of a crack line formed in the method for dividing a glass substrate in the first embodiment of the present invention.

With further reference to FIG. 2B, the sliding of the cutter edge 51 forms a scribe line SL and a crack line CL simultaneously in one case and forms only the scribe line SL in the other case. The crack line CL is a crack extending from a dent of the scribe line SL in the thickness direction DT and extends linearly in the front surface SF. The method described below can form only the scribe line SL, and then, form the crack line CL along the scribe line SL.

Figure 3:
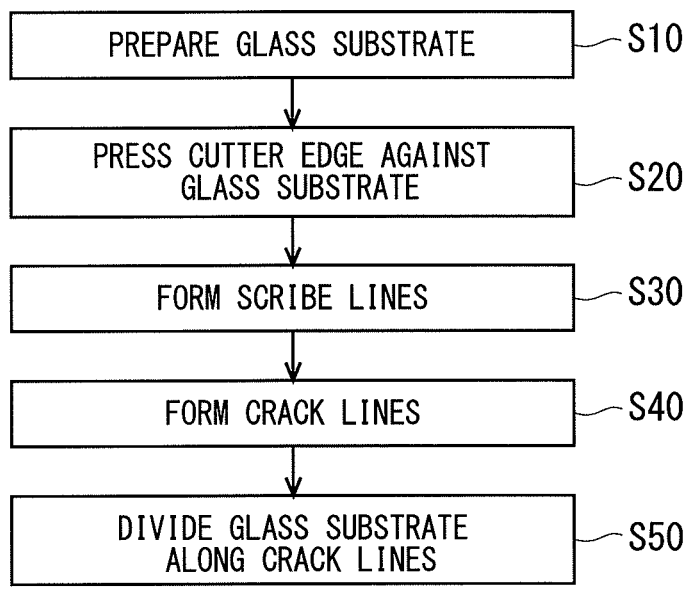
FIG. 3 is a flowchart schematically illustrating steps of the method for dividing a glass substrate in the first embodiment of the present invention.

With reference to FIG. 3, a method for dividing the glass substrate 4 mainly includes steps S10 to S50. The details thereof will now be described.

Figure 4:
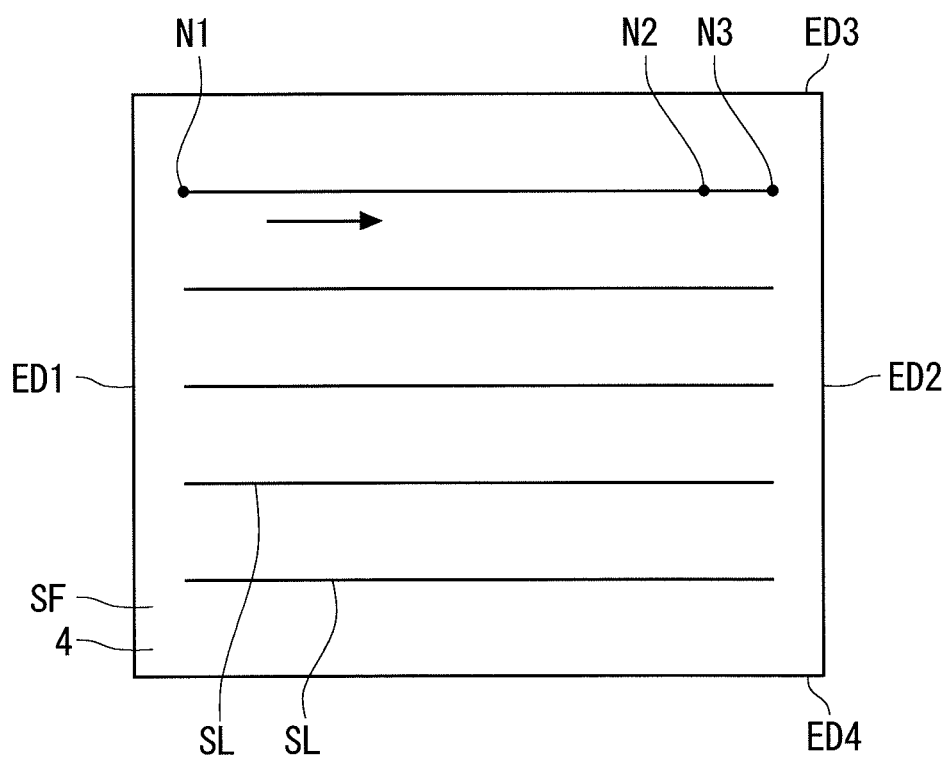
FIG. 4 is a top view schematically illustrating a first step of the method for dividing a glass substrate in the first embodiment of the present invention.

With reference to FIG. 4, first, the glass substrate 4 is prepared in step S10 (FIG. 3). The glass substrate 4 has a flat front surface SF surrounded by a perimeter including an edge ED1 (first edge) and an edge ED2 (second edge) opposite to each other. The glass substrate has the thickness direction DT perpendicular to the front surface SF (FIGS. 1A, 2A, and 2B). In the example illustrated in FIG. 4, the perimeter has a rectangular shape. The edges ED1 and ED2 are accordingly parallel to each other. In the example illustrated in FIG. 4, the edges ED1 and ED2 are short sides of a rectangle.

In step S20 (FIG. 3), the cutter edge 51 is pressed against the front surface SF of the glass substrate 4 at a position N1. The position N1 will be described below in detail. With reference to FIG. 1A, the cutter edge 51 is pressed so that, on the front surface SF of the glass substrate 4, the protruding portion PP of the cutter edge 51 is positioned between the edge ED1 and the side portion PS and the side portion PS of the cutter edge 51 is positioned between the protruding portion PP and the ED2.

In step S30 (FIG. 3), a plurality of scribe lines SL (in the figure, five lines) are formed on the front surface SF of the glass substrate 4. The scribe line SL is formed between the position N1 (first position) and a position N3. A position N2 (second position) is located between the positions N1 and N3. The scribe line SL is accordingly formed between the positions N1 and N2 and between the positions N2 and N3. The positions N1, N2, and N3 are apart from the perimeter of the front surface SF of the glass substrate 4. The scribe lines SL formed are accordingly apart from the perimeter of the glass substrate 4. The position N1 is closer to the edge ED1 of the edges ED1 and ED2. The position N2 is closer to the edge ED2 of the edges ED1 and ED2. The scribe line SL is formed by a scratch made by causing the cutter edge 51 pressed against the front surface SF of the glass substrate 4 to slide on the front surface SF.

In the formation of the scribe lines SL, the cutter edge 51 is displaced from the position N1 to the position N2 and is further displaced from the position N2 to the position N3 in the present embodiment. With reference to FIG. 1A, the cutter edge 51 is displaced in a direction DA that is a direction from the edge ED1 toward the edge ED2. The direction DA corresponds to the direction in which an axis AX extending from the cutter edge 51 is projected onto the front surface SF. In this case, the cutter edge 51 is dragged on the front surface SF by the shank 52.

Figure 5:
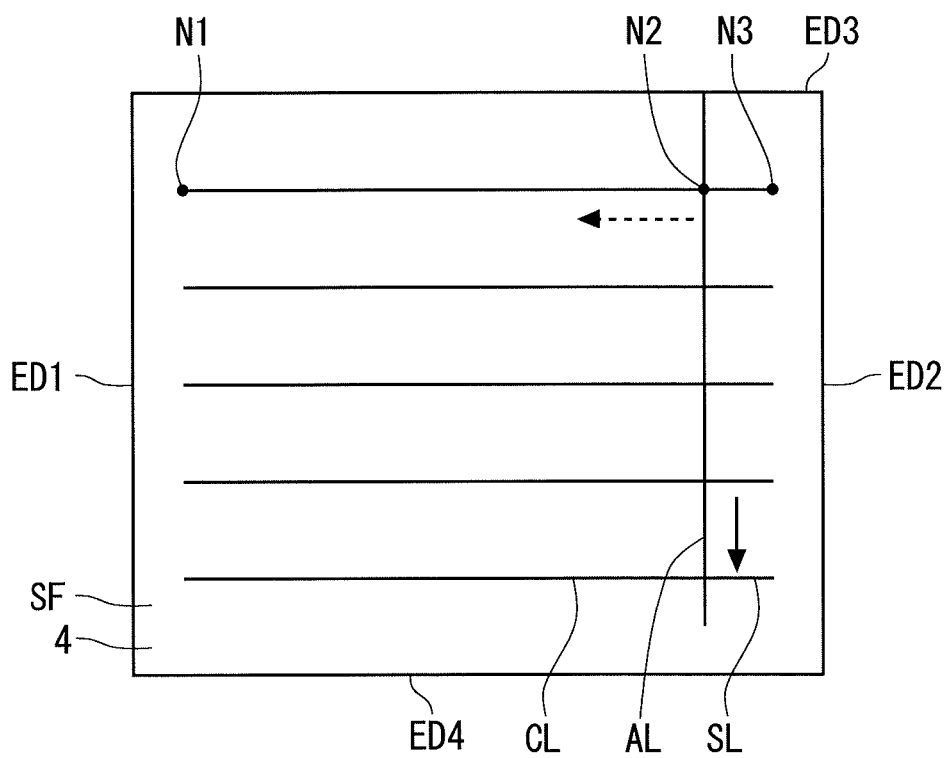
FIG. 5 is a top view schematically illustrating a second step of the method for dividing a glass substrate in the first embodiment of the present invention.

With reference to FIG. 5, after the formation of the scribe lines SL, in step S40 (FIG. 3), cracks of the glass substrate 4 in the thickness direction DT (FIG. 2B) are extended along the scribe lines SL from the position N2 toward the position N1 (see a dashed arrow in the figure) to form the crack lines CL. The formation of the crack lines CL starts by an assist line AL and the scribe line SL intersecting each other at the position N2. For this purpose, the assist line AL is formed after the formation of the scribe lines SL. The assist line AL is one type of crack line (FIG. 2B) and is formed by a crack of the glass substrate 4 in the thickness direction DT.

Although the method for forming the assist line AL is not particularly limited, as illustrated in FIG. 5, it may be formed with the perimeter of the front surface SF being a starting point. In this case, the operation of the cutter edge 51 to ride over the perimeter of the front surface SF of the glass substrate 4 is necessary for forming the assist line AL. However, only one assist line AL is typically formed, which is fewer than the scribe lines SL formed, and thus, the influence of this operation is small.

The crack lines CL are less likely to be formed in the direction from the position N2 to the position N3 than in the direction from the position N2 to the position N1. In other words, ease of the extension of the crack lines CL involves direction dependency. This can result in a phenomenon in which the crack lines CL are formed between the positions N1 and the N2 and are not formed between the positions N2 and N3. The present embodiment is aimed to divide the glass substrate 4 along between the positions N1 and N2 and is not aimed to separate the glass substrate 4 along between the positions N2 and N3. Thus, while the formation of the crack line CL is necessary between the positions N1 and N2, the difficulty of forming the crack line CL between the positions N2 and N3 is not an issue.

In step S50 (FIG. 3), the glass substrate 4 is divided along the crack lines CL. Specifically, a breaking step is performed. In the case where the crack lines CL fully penetrates in the thickness direction DT in its formation, the formation of the crack lines CL and the dividing of the glass substrate 4 occur simultaneously. In this case, the breaking step can be omitted.

The glass substrate 4 is divided as described above.

With reference to FIG. 6, a first modification relates to the case in which the intersection of the assist line AL and the scribe lines SL is not sufficient as a trigger to start the formation of the crack lines CL (FIG. 5). With reference to FIG. 7, the glass substrate 4 is separated along the assist line AL by applying a stress to the glass substrate 4. The formation of the crack lines CL accordingly starts. Although the assist line AL is formed on the front surface SF of the glass substrate 4 in FIG. 6, the assist line AL for dividing the glass substrate 4 may be formed on the rear surface (the surface opposite to the front surface SF) of the glass substrate 4. In this case, the assist line AL and the scribe lines SL are not in direct contact with each other though they intersect each other at the position N2 in a planar layout.

With reference to FIG. 8, in a second modification, the cutter edge 51 is pressed against the front surface SF of the glass substrate 4 at the position N3 in step S20 (FIG. 3). In the formation of the scribe lines SL in step S30 (FIG. 3), the cutter edge 51 is displaced from the position N3 to the position N2 and is further displaced from the position N2 to the position N1 in the present modification. With reference to FIG. 1A, the cutter edge 51 is displaced in a direction DB that is a direction from the edge ED2 toward the edge ED1. The direction DB corresponds to the direction opposite to the direction in which the axis AX extending from the cutter edge 51 is projected onto the front surface SF. In this case, the cutter edge 51 is pushed forward on the front surface SF by the shank 52.

With reference to FIG. 9, in a third modification, in the formation of the scribe lines SL in step S30 (FIG. 3), the cutter edge 51 is pressed against the front surface SF of the glass substrate 4 with a greater force at the position N2 than at the position N1. Specifically, the load of the cutter edge 51 is increased when the formation of the scribe line SL reaches a position N4, which is a position between the positions N1 and N2. In other words, the load on the scribe line SL becomes higher between the positions N4 and N3, which is the end portion of the scribe line SL, than at the position N1. Consequently, the formation of the crack line CL is easily induced from the position N2 while alleviating the load other than at the end portion.

Second Embodiment

Figure 10:
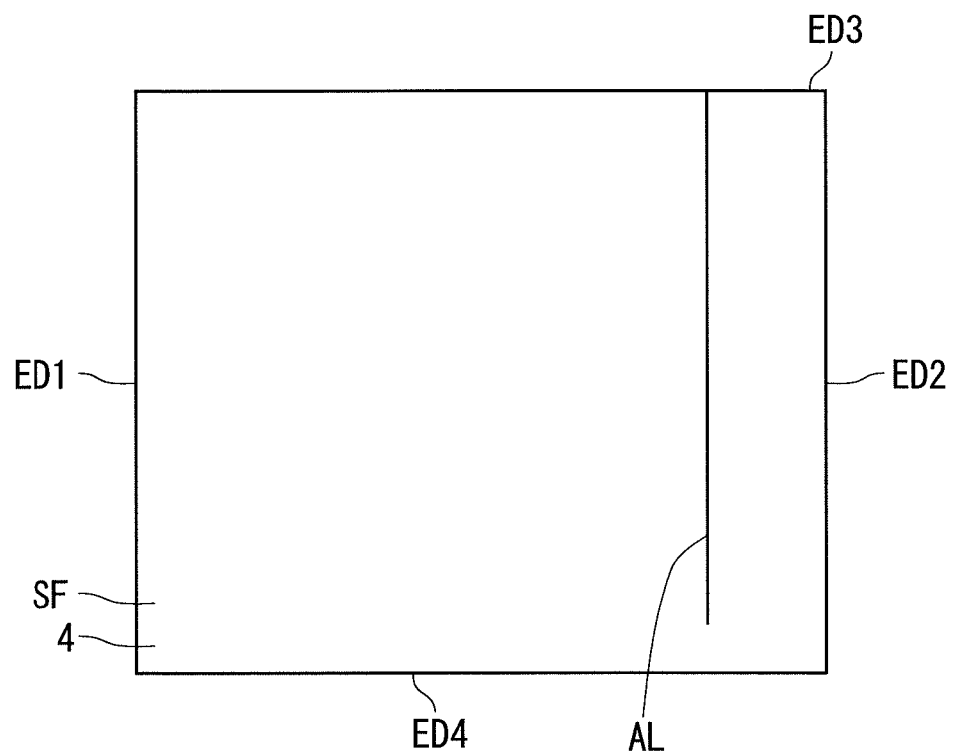
FIG. 10 is a top view schematically illustrating a first step of a method for dividing a glass substrate in a second embodiment of the present invention.

With reference to FIG. 10, the assist line AL is formed before the formation of the scribe lines SL in the present embodiment. The method for forming the assist line AL is similar to that of FIG. 5 (first embodiment).

Figure 11:
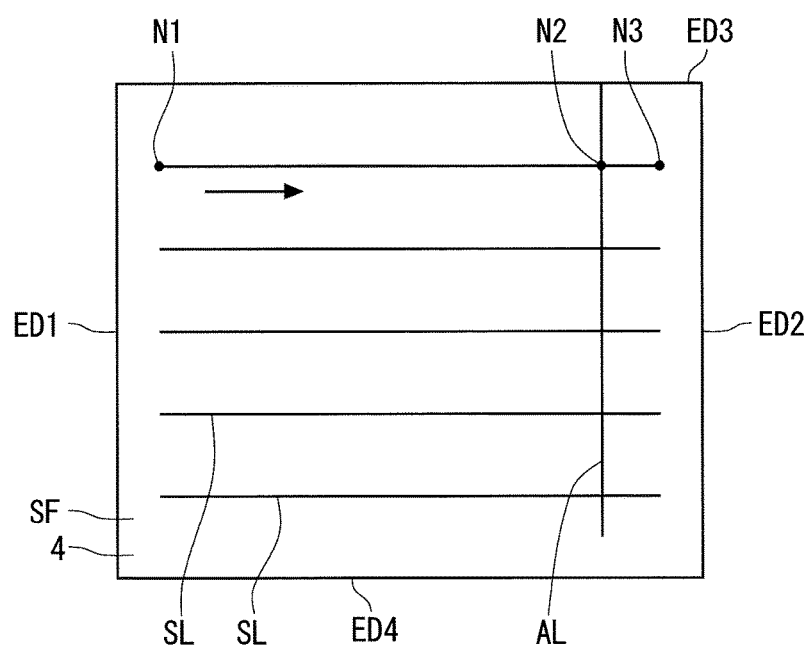
FIG. 11 is a top view schematically illustrating a second step of the method for dividing a glass substrate in the second embodiment of the present invention.

With reference to FIG. 11, then, the scribe lines SL are formed in step S30 (FIG. 3). The method for forming the scribe lines SL is similar to that of FIG. 4 (first embodiment). The assist line AL and the scribe line SL intersect each other at the position N2.

With reference to FIG. 12, the glass substrate 4 is separated along the assist line AL by applying a stress to the glass substrate 4. The formation of the crack lines CL starts similarly as in the first embodiment (see a dashed arrow in the figure). Although the assist line AL is formed on the front surface SF of the glass substrate 4 in FIG. 10, the assist line AL for separating the glass substrate 4 may be formed on the rear surface (a surface opposite to the front surface SF) of the glass substrate 4. In this case, the assist line AL and the scribe lines SL are not in direct contact with each other though they intersect each other at the position N2 in a planar layout.

The other steps are substantially identical to those of the first embodiment described above.

Figure 13:
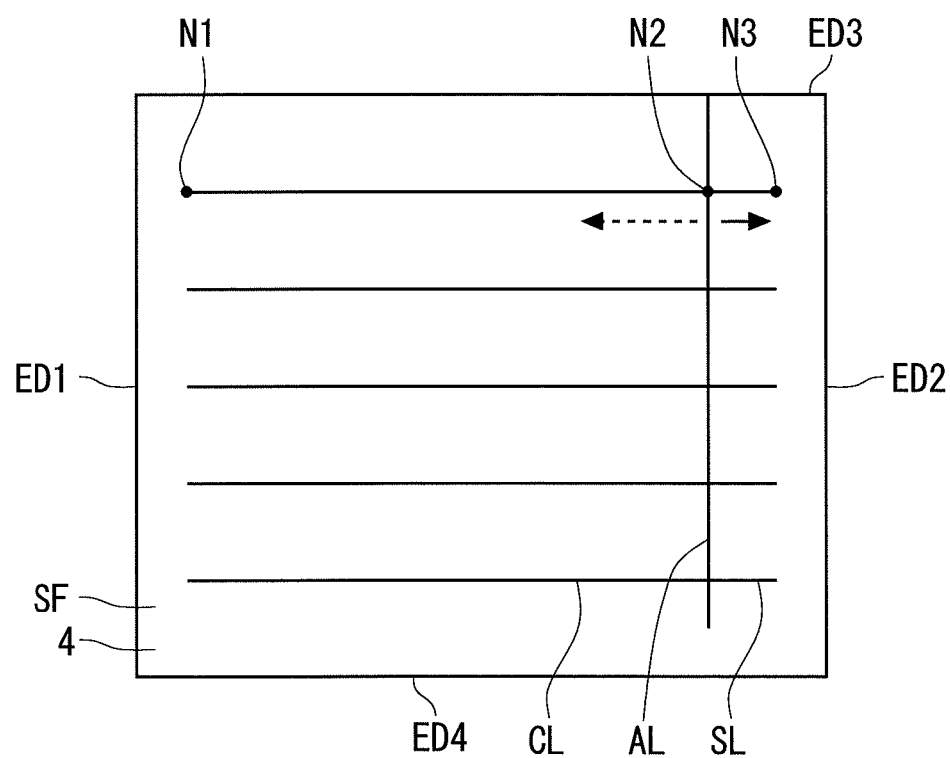
FIG. 13 is a top view schematically illustrating a step of a method for dividing a glass substrate in a first modification of the second embodiment of the present invention.

With reference to FIG. 13, in a first modification, the formation of the crack lines CL starts by the assist line AL and the scribe line SL intersecting each other at the position N2.

Figure 14:
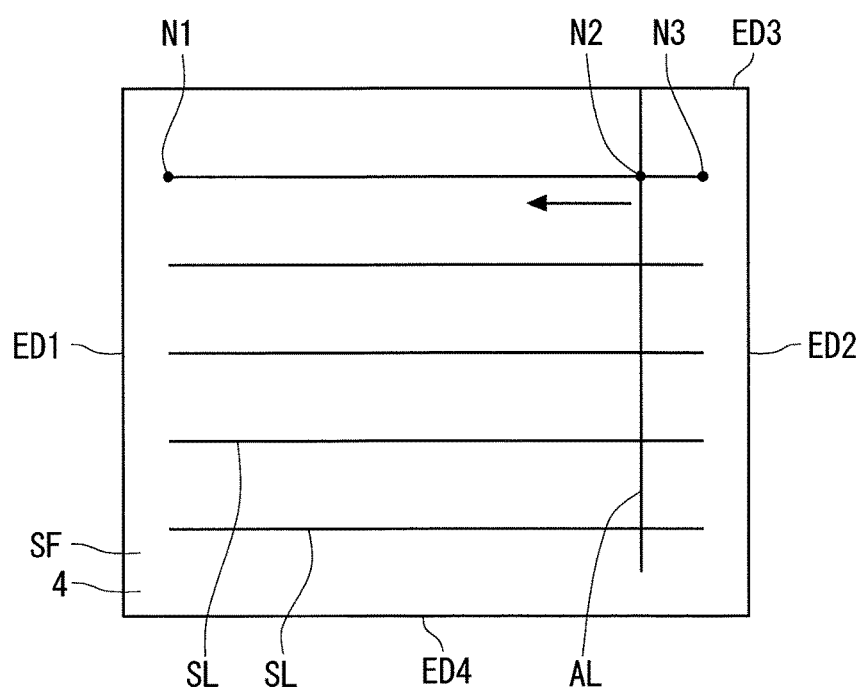
FIG. 14 is a top view schematically illustrating a first step of a method for dividing a glass substrate in a second modification of the second embodiment of the present invention.
Figure 15:
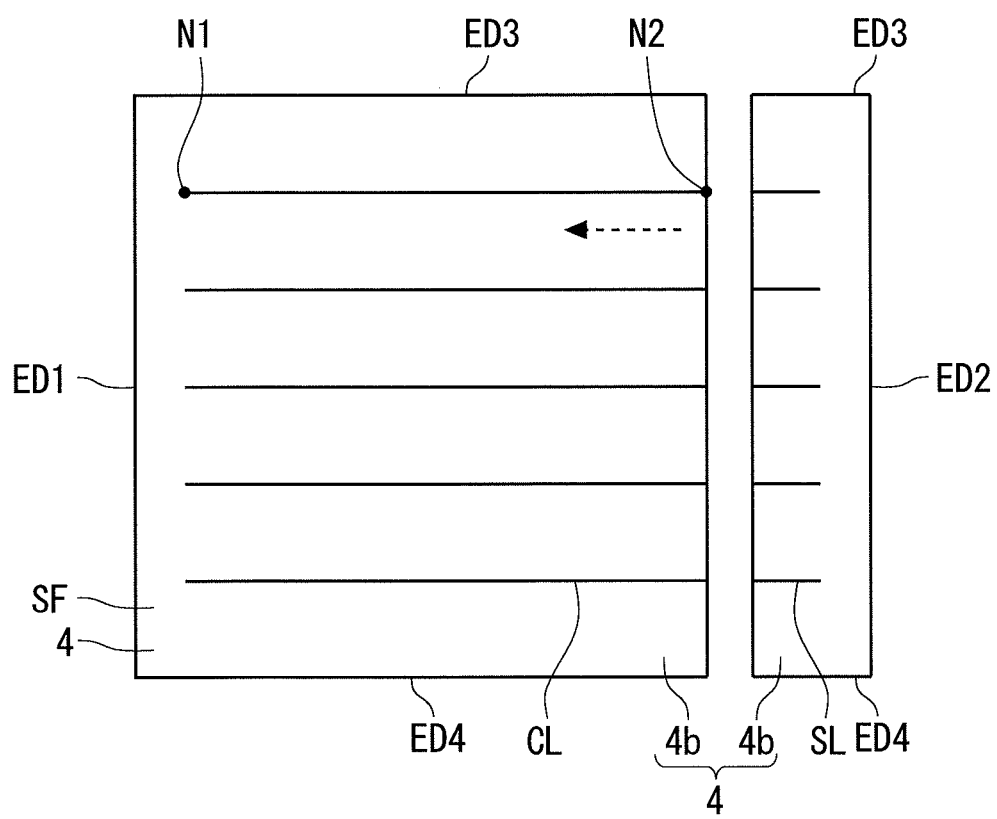
FIG. 15 is a top view schematically illustrating a second step of the method for dividing a glass substrate in the second modification of the second embodiment of the present invention.

With reference to FIG. 14, in a second modification, the scribe line SL is formed from the position N3 to the position N1 as in FIG. 8 (first embodiment). With reference to FIG. 15, the glass substrate 4 is separated along the assist line AL by applying a stress to the glass substrate 4. Consequently, the formation of the crack lines CL starts (see a dashed arrow in the figure).

Figure 16:
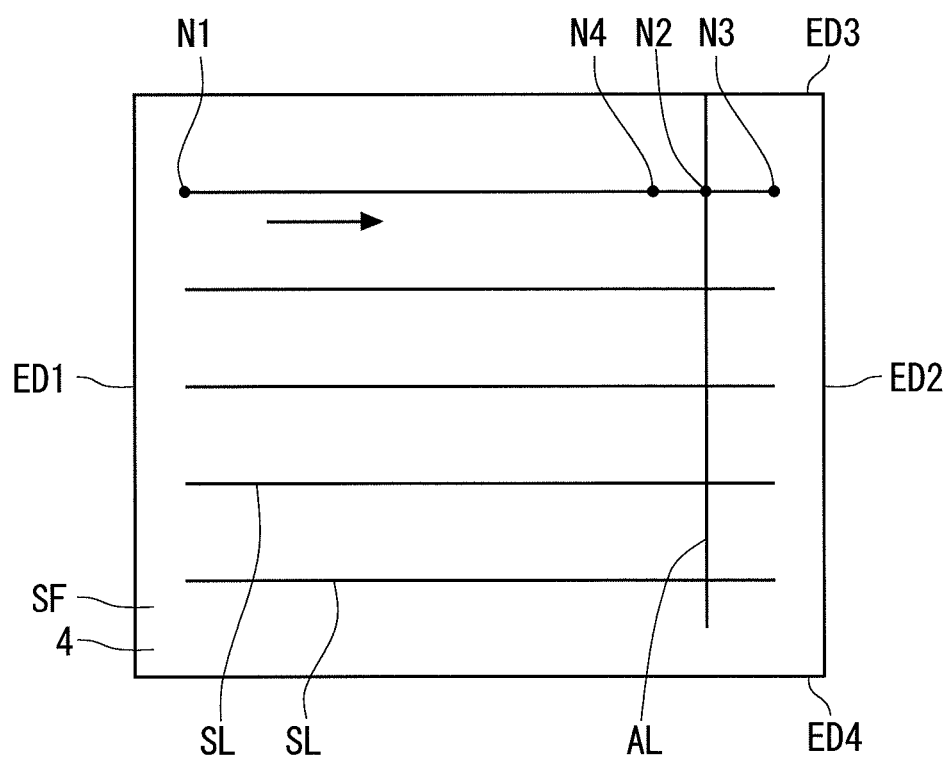
FIG. 16 is a top view schematically illustrating a step of a method for dividing a glass substrate in a third modification of the second embodiment of the present invention.

With reference to FIG. 16, in a third modification, in the formation of the scribe lines SL in step S30 (FIG. 3), the cutter edge 51 is pressed against the front surface SF of the glass substrate 4 with a greater force at the position N2 than at the position N1. Specifically, the load of the cutter edge 51 is increased when the formation of the scribe line SL reaches the position N4, which is a position between the positions N1 and N2. In other words, the load on the scribe line SL is increased between the positions N4 and N3, which is the end portion of the scribe line SL, than at the position N1. Consequently, the formation of the crack lines CL from the position N2 is easily induced while alleviating the load other than at the end.

Third Embodiment

With reference to FIG. 17, in the present embodiment, the scribe lines SL are formed in step S30 (FIG. 3) as follows.

The cutter edge 51 is caused to slide from the position N1 beyond the edge ED2. When the cutter edge 51 passes through the edge ED2, the stress distortion generated inside the substrate directly below the scribe line is released, so that the crack line extends from the end of the scribe line SL located on the edge ED2 toward the position N1 (FIG. 3: step S40)

Although a constant load may be applied to the cutter edge 51 in the formation of the scribe lines SL, the load applied to the cutter edge 51 at the position N2 may be increased when the cutter edge 51 is displaced from the position N1 to the position N2. For example, the load is increased by approximately 50%. The cutter edge 51 whose load has been increased is caused to slide beyond the edge ED2. In other words, the load of the cutter edge 51 is increased at the end portion of the scribe line SL. When the cutter edge 51 reaches the edge ED2, the crack line extends from the end of the scribe line SL located on the edge ED2 via the position N2 toward the position N1 (FIG. 3: step S40). When the load is increased in this manner, the stress distortion also increases, and the stress distortion is more likely to be released when the cutter edge 51 passes through the edge ED2. The crack line is thus formed more reliably.

The other steps are substantially identical to those of the first embodiment above.

Fourth Embodiment

With reference to FIG. 18, in the present embodiment, the scribe lines SL extending form the position N1 via the position N2 to the edge ED2 are formed in step S30 (FIG. 3).

With reference to FIG. 19, a stress is applied between the position N2 and the edge ED2. The formation of the crack lines along the scribe lines SL is accordingly induced (FIG. 3: step S40).

As the application of a stress, specifically, the pressed cutter edge 51 is caused to slide between the position N2 and the edge ED2 (in the figure, the area between the dashed line and the edge ED2) on the front surface SF. This sliding is performed until the cutter edge 51 reaches the edge ED2. The cutter edge 51 is caused to slide preferably to intersect the path of the scribe line SL that has been first formed, more preferably to overlap the path of the scribe line SL that has been first formed. The length of a second sliding is, for example, approximately 0.5 mm. A second sliding may be performed after each of a plurality of scribe lines SL (FIG. 18) is formed. Alternatively, the step of forming one scribe line SL and the step of causing the cutter edge 51 to slide may be performed in order for each scribe line SL.

In a modification, to apply a stress between the position N2 and the edge ED2, laser light may be applied between the position N2 and the edge ED2 on the front surface SF, in place of causing the cutter edge 51 to slide again as described above. A resultant thermal stress can also induce the formation of crack lines.

The other steps are substantially identical to those of the first embodiment described above.

Fifth Embodiment

With reference to FIG. 20, in the present embodiment, the scribe lines SL apart from the perimeter of the front surface SF are formed by displacing the cutter edge 51 from the position N1 to the position N2 and further to the position N3 in step S30 (FIG. 3). The method for forming the scribe lines SL is substantially identical to that of FIG. 4 (first embodiment).

Figure 21:
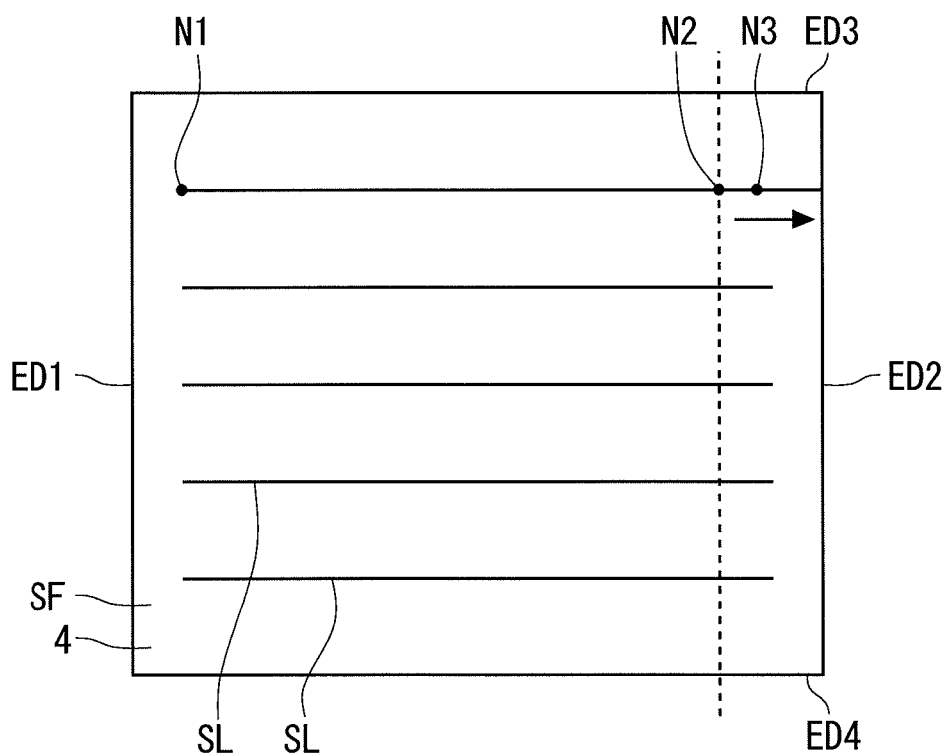
FIG. 21 is a top view schematically illustrating a second step of the method for dividing a glass substrate in the fifth embodiment of the present invention.

With reference to FIG. 21, a stress is applied as in FIG. 19 (the fourth embodiment and the modification thereof). The formation of crack lines along the scribe lines SL is accordingly induced (FIG. 3: step S40).

Figure 22:
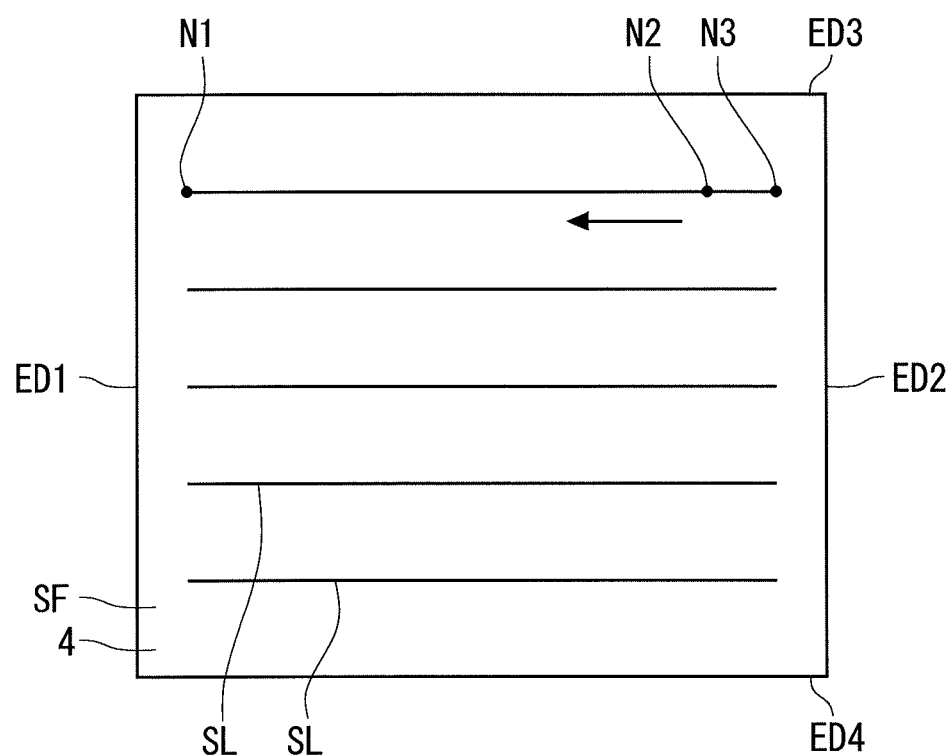
FIG. 22 is a top view schematically illustrating a step of a method for dividing a glass substrate in a modification of the fifth embodiment of the present invention.

With reference to FIG. 22, in a modification of the step of FIG. 20, the cutter edge 51 may be displaced from the position N3 to the position N2 and further from the position N2 to the position N1 in the formation of the scribe lines SL.

The other steps are substantially identical to those of the first embodiment described above.

Sixth Embodiment

Figure 23A:
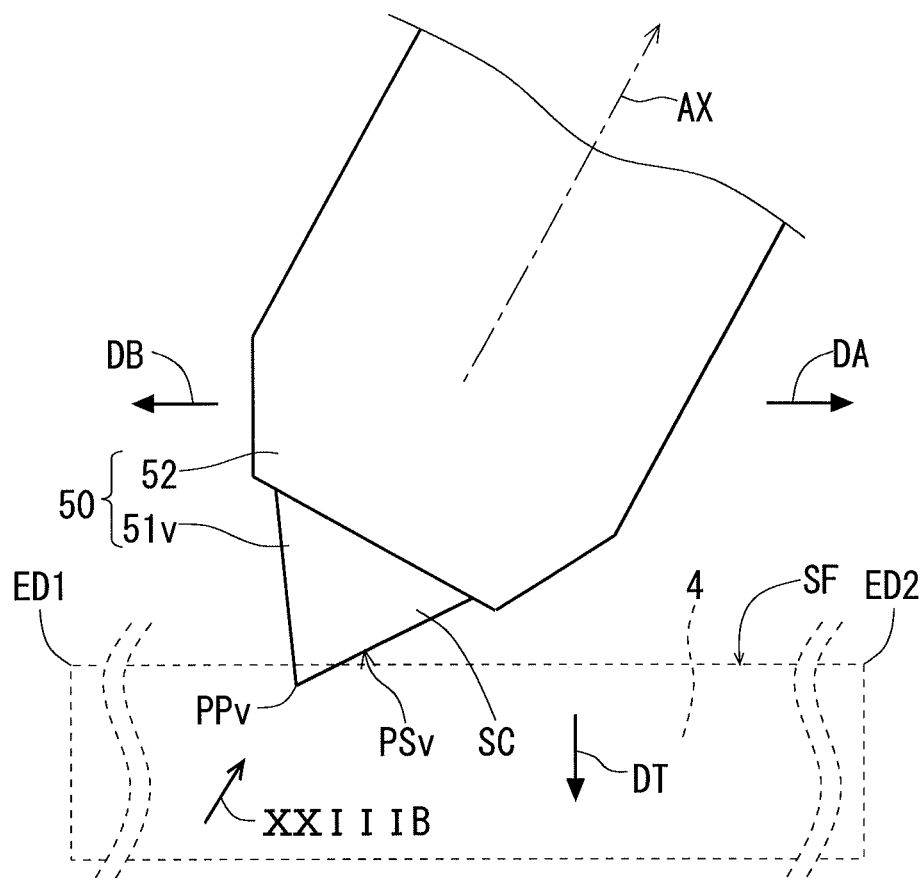
FIG. 23A is a side view schematically illustrating a configuration of a tool for use in a method for dividing a glass substrate in a sixth embodiment of the present invention.
Figure 23B:
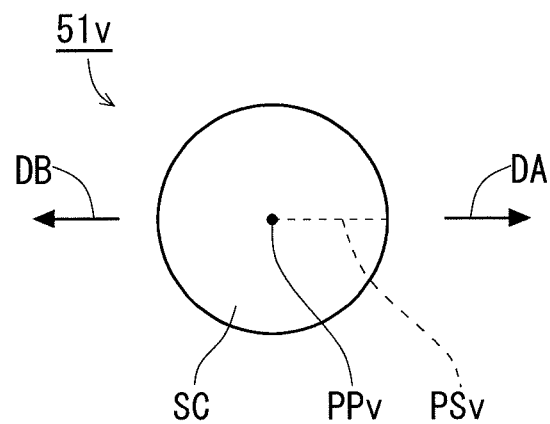
FIG. 23B is a plan view schematically illustrating a configuration of a cutter edge of the tool for use in the method for dividing a glass substrate in the sixth embodiment of the present invention, which is seen from an arrow XXIIIB of FIG. 23A.

With reference to FIGS. 23A and 23B, a cutter edge 51v may be used in place of the cutter edge 51 (FIGS. 1A and 1B) in the embodiments above. The cutter edge 51v has a shape of a cone with a vertex and a conical surface SC. A protruding portion PPv of the cutter edge 51v is formed by the vertex. The side portion PSv of the cutter edge is formed along an imaginary line (a dashed line in FIG. 23B) extending from the vertex on the conical surface SC. The side portion PSv accordingly has a convex shape extending linearly.

Although the first and second edges of the perimeter of the glass substrate are short sides of a rectangle in the embodiments above, the first and second edges may be long sides of the rectangle. The shape of the perimeter is not limited to a rectangle and may be, for example, a square. The first and second edges are not limited to linear edges and may be curved edges. Although the front surface of the glass substrate is flat in the embodiments above, the front surface may be curved.

The embodiments according to the present invention may be arbitrarily combined, modified, and omitted as appropriate within the scope of the present invention.

EXPLANATION OF REFERENCE SIGNS

N1 position (first position)
N2 position (second position)
ED1 edge (first edge)
ED2 edge (second edge)
AL assist line
CL crack line
SF front surface
SL scribe line
PP, PPv protruding portion
PS, PSv side portion
glass substrate
50 cutting tool
51, 51v cutter edge
52 shank

The invention claimed is:

1. A method for dividing a brittle-material substrate, the method comprising:
preparing a brittle-material substrate made of glass material and including a surface and having a thickness direction perpendicular to said surface, said surface being surrounded by a perimeter including first and second edges opposite to each other;
pressing a cutter edge against said surface of said brittle-material substrate, said cutter edge including a protruding portion and a side portion extending from said protruding portion and having a convex shape;
forming, by plastic deformation, a scribe line having a groove shape involving no vertical crack, said scribe line being formed between a first position closer to said first edge and a second position closer to said second edge on said surface of said brittle-material substrate by causing said cutter edge pressed in said pressing to slide on said surface of said brittle-material substrate;
after said forming the scribe line, forming a crack line by cracking said brittle-material substrate in said thickness direction, from said second position toward said first position along said scribe line;
dividing said brittle-material substrate along said crack line, wherein
said forming the scribe line is performed by forming the scribe line spaced away from said perimeter, and
the method further comprises forming an assist line by cracking said brittle-material substrate in said thickness direction, said assist line and said scribe line intersecting each other at said second position, wherein said step of forming the crack line is commenced at said second position.

2. The method for dividing a brittle-material substrate according to claim 1, wherein said forming the assist line is performed after said forming the scribe line.

3. The method for dividing a brittle-material substrate according to claim 1, wherein said forming the assist line is performed before said forming the scribe line.

4. The method for dividing a brittle-material substrate according to claim 1, wherein in said forming the scribe line, said cutter edge is pressed against said surface of said brittle-material substrate with a greater force at said second position than at said first position.

5. The method for dividing a brittle-material substrate according to claim 1, wherein
said cutter edge includes first to third surfaces adjacent to each other, a vertex at which said first to third surfaces meet, and a ridge formed by said second and third surfaces, and
said protruding portion of said cutter edge comprises said vertex, and said side portion of said cutter edge comprises said ridge.

6. The method for dividing a brittle-material substrate according to claim 1, wherein
said cutter edge has a shape of a cone including a vertex and a conical surface, and
said protruding portion of said cutter edge comprises said vertex, and said side portion of said cutter edge is formed along an imaginary line extending from said vertex on said conical surface.

7. The method for dividing a brittle-material substrate according to claim 1, wherein said forming the scribe line comprises displacing said cutter edge from said first position to said second position.

8. The method for dividing a brittle-material substrate according to claim 1, wherein said forming a scribe line comprises displacing said cutter edge from said second position to said first position.

9. A method for dividing a brittle-material substrate, the method comprising:
preparing a brittle-material substrate made of glass material and including a surface and having a thickness direction perpendicular to said surface, said surface being surrounded by a perimeter including first and second edges opposite to each other;
pressing a cutter edge against said surface of said brittle-material substrate, said cutter edge including a protruding portion and a side portion extending from said protruding portion and having a convex shape;
forming, by plastic deformation, a scribe line having a groove shape involving no vertical crack, said scribe line being formed between a first position closer to said first edge and a second position closer to said second edge on said surface of said brittle-material substrate by causing said cutter edge pressed in said pressing to slide on said surface of said brittle-material substrate; said scribe line being spaced away from said perimeter, and
forming an assist line on said brittle-material substrate, said assist line and said scribe line intersecting each other at said second position, and applying a first stress to said assist line to cause cracking of said brittle-material substrate in said thickness direction along said assist line, wherein
forming a crack line along said scribe line is commenced by applying said first stress to said brittle-material substrate to separate said brittle-material substrate along said assist line, thereby initiating formation of said crack line from said second position for division of said brittle-material substrate along said crack line.

10. The method for dividing a brittle-material substrate according to claim 9, wherein said forming said assist line comprises forming said assist line on another surface that is located opposite to said surface of said brittle-material substrate.

11. The method for dividing a brittle-material substrate according to claim 9, wherein the division of said brittle-material substrate along said crack line is initiated by said first stress.

12. The method for dividing a brittle-material substrate according to claim 9, further comprising applying a second stress to said crack line to initiate the division of said brittle-material substrate along said crack line.

13. The method for dividing a brittle-material substrate according to claim 9, wherein said forming the assist line is performed after said forming the scribe line.

14. The method for dividing a brittle-material substrate according to claim 9, wherein said forming the assist line is performed before said forming the scribe line.

15. The method for dividing a brittle-material substrate according to claim 9, wherein in said forming the scribe line, said cutter edge is pressed against said surface of said brittle-material substrate with a greater force at said second position than at said first position.

16. The method for dividing a brittle-material substrate according to claim 9, wherein
said cutter edge includes first to third surfaces adjacent to each other, a vertex at which said first to third surfaces meet, and a ridge formed by said second and third surfaces, and
said protruding portion of said cutter edge comprises said vertex, and said side portion of said cutter edge comprises said ridge.

17. The method for dividing a brittle-material substrate according to claim 9, wherein
said cutter edge has a shape of a cone including a vertex and a conical surface, and
said protruding portion of said cutter edge comprises said vertex, and said side portion of said cutter edge is formed along an imaginary line extending from said vertex on said conical surface.

18. The method for dividing a brittle-material substrate according to claim 9, wherein said forming the scribe line comprises displacing said cutter edge from said first position to said second position.

19. The method for dividing a brittle-material substrate according to claim 9, wherein said forming a scribe line comprises displacing said cutter edge from said second position to said first position.

* * * * *